(12) United States Patent
Herr et al.

(10) Patent No.: US 8,061,996 B2
(45) Date of Patent: Nov. 22, 2011

(54) WIND TURBINE BLADE PLANFORMS WITH TWISTED AND TAPERED TIPS

(75) Inventors: Stefan Herr, Greenville, SC (US); Kevin W. Kinzie, Moore, SC (US); Brandon S. Gerber, Ware Shoals, SC (US); Kevin J. Standish, Simpsonville, SC (US); Klaus Koegler, Rheine (DE); Benoit P. Petitjean, Greer, SC (US)

(73) Assignee: General Electric Company, Schenectady, NY (US)

( * ) Notice: Subject to any disclaimer, the term of this patent is extended or adjusted under 35 U.S.C. 154(b) by 845 days.

(21) Appl. No.: 12/129,997

(22) Filed: May 30, 2008

(65) Prior Publication Data

US 2009/0297355 A1    Dec. 3, 2009

(51) Int. Cl.
*F04D 29/38* (2006.01)

(52) U.S. Cl. ..................................... 416/223 R

(58) Field of Classification Search ........................ None
See application file for complete search history.

(56) References Cited

U.S. PATENT DOCUMENTS

| 2006/0002794 | A1 | 1/2006 | Moroz et al. | |
| 2006/0216153 | A1* | 9/2006 | Wobben | 416/241 A |

FOREIGN PATENT DOCUMENTS

| EP | 1832744 | 12/2007 |
| WO | 2006133715 | 12/2006 |

OTHER PUBLICATIONS

"Design of Tapered and Twisted Blade for the NREL Combined Experiment Rotor", Publication No. NREL/SR-500-26173 (Apr. 1999).

* cited by examiner

*Primary Examiner* — Richard Edgar
(74) *Attorney, Agent, or Firm* — William F. Heinze; Ernest G. Cusick; Frank A. Landgraff

(57) ABSTRACT

A blade for a wind turbine includes a total backward twist of between approximately 6 degrees and approximately 15 degrees between an outer approximately 1 percent to 10 percent of a rotor radius of the blade; and an approximate planform distribution within the following ranges

| r/R | c/R(LE) | c/R(TE) |
|---|---|---|
| .96 | 0.60 to 0.65% | −1.42 to −1.34% |
| .968 | 0.54 to 0.59% | −1.31 to −1.34% |
| .974 | 0.39 to 0.58% | −1.36 to −1.22% |
| .9806 | 0.13 to 0.57% | −1.45 to −1.06% |
| .9856 | −0.23 to 0.56% | −1.56 to −0.74% |
| .9906 | −0.76 to 0.55% | −1.74 to −0.24% |
| .9956 | −1.44 to 0.54% | −1.99 to 0.23% |
| 1.00 | −2.17 to 0.54% | −2.27 to 0.44% | where "r/R" is an approximate normalized distance outward from a center of rotation of the blade along a span of the blade; and "c/R(LE)" and "c/R(TE)" are approximate relative positions of a leading (LE) and trailing edge (TE) of a chord "c" expressed as a percentage of a distance outward from the center of rotation at each r/R.

15 Claims, 9 Drawing Sheets

WIND TURBINE BLADE PLANFORMS WITH TWISTED AND TAPERED TIPS

CROSS-REFERENCE TO RELATED APPLICATIONS

The subject matter disclosed here generally relates to that disclosed in U.S. patent application Ser. No. 12/129,942 for "Wind Turbine Blades with Twisted Tips" and U.S. patent application Ser. No. 12/129,966 for "Wind Turbine Blades with Twisted and Tapered Tips," each of which is being filed concurrently with this application and is incorporated by reference here.

BACKGROUND OF THE INVENTION

1. Technical Field

The subject matter described here generally relates to fluid reaction surfaces with specific blade structures, and, more particularly, to wind turbines having blade planforms with twisted and tapered tips.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a hub to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that receives input from an anemometer 18.

The blades 10 generate lift and capture momentum from moving air that is them imparted to a rotor as the blades spin in the "rotor plane." Each blade is typically secured at its "root" end, and then "rotor radiuss" radially "outboard" to a free, "tip" end. The front, or "leading edge," of the blade connects the forward-most points of the blade that first contact the air. The rear, or "trailing edge," of the blade is where airflow that has been separated by the leading edge rejoins after passing over the suction and pressure surfaces of the blade. A "chord line" connects the leading and trailing edges of the blade in the direction of the typical airflow across the blade. The length of the chord line is simply the "chord."

The outboard ends of the blades 10 are called "tips" and the distance from the tip to the root, at the opposite end of the blade, is called the "rotor radius." Since the root of the blade 10 is displaced from the blade's center of rotation when it is connected to the hub, the distance from the center of rotation of the blade 10 to tip is referred to as the "rotor radius" and designated here with the letter "R." Since many blades 10 change their chord over the span (and corresponding rotor radius), the chord length is referred to as the "root chord," near the root, and the "tip chord," near the tip of the blade. The resulting shape of the blade 10, when viewed perpendicular to the direction of flow, is called the "planform." The thickness of a blade 10 varies across the planform, and the term "thickness" is typically used to describe the maximum distance between the low pressure suction surface and the high pressure surface on the opposite side of the blade for any particular chord line.

"Angle of attack" is a term that is used in to describe the angle between the chord fine of the blade 10 and the vector representing the relative motion between the blade and the air. "Pitching" refers to rotating the angle of attack of the entire blade 10 into or out of the wind in order to control the rotational speed and/or absorption of power from the wind. For example, pitching the blade "towards feather" rotates of the leading edge of the blade 10 into the wind, while pitching the blades "towards stall" rotates the leading edge of the blade out of the wind.

Since the speed of the blades 10 relative to air increases along the rotor radius of the rotating blades, the shape of the blades is typically twisted in order to maintain a generally consistent angle of attack at most points along the rotor radius of the blade. For example, FIG. 2 illustrates a conventional blade twist distribution 20 showing the "twist" angle θ of the blades 10 in degrees on the vertical axis. The horizontal axis in FIG. 2 shows the normalized distance outward from the center of rotation of blade 10 along the span, "r/R," referred to here as "percent of rotor radius" or "normalized rotor radius." Due to the relatively small size of the hub as compared to the length of the blades 10, this "percent of rotor radius" may also be approximated as the normalized distance outward starting from the root of the blade, or "percent of span," rather than starting from the center of rotation of the blade.

Positive values of twist angle θ in these figures indicate that the blade 10 is twisted towards feather, while negative values indicate that the blade is twisted toward stall. The twist angle θ generally staffs with a high positive (towards feather) value inboard and then "rotates" towards stall in the outboard direction along the rotor radius of the blade. This change is called "forward twist" of the blade. When the twist angle is rotated towards feather the change is called "backward twist." A zero value for twist angle θ indicates that portion of the blade 10 will be in the rotor plane when the blade is arranged on the rotor 8 with zero pitch.

FIG. 3 is an enlarged portion of the twist distribution 20 shown in FIG. 2, where the entire blade 10 has also been pitched forward. Since FIG. 3 shows the twist distribution of an outer portion of the blade 10 near the tip, it is also referred to as a "tip twist distribution." FIG. 3 corresponds to the following numerical data:

| r/R | θ - 20 |
|---|---|
| 96.00% | −1.63 |
| 96.80% | −1.68 |
| 97.40% | −1.66 |
| 98.06% | −1.62 |
| 98.56% | −1.54 |
| 99.06% | −1.35 |
| 99.56% | −0.58 |
| 100.00% | 1.67 |

However, other tip twist distributions have also been published. For example, "Design of Tapered and Twisted Blade for the NREL Combined Experiment Rotor," Publication No. NREL/SR-500-26173 (April 1999) illustrates a twist distribution which is negative from about 75% of rotor radius to the blade tip.

The noise and power performance of wind turbine blades 10 depends, in part, upon vortex development at the tip of the blade. Various techniques have been proposed to control this vortex development. For example, commonly-owned co-pending U.S. application Ser. No. 11/827,532 filed on Jul. 12, 2007 discloses a wind turbine blade having a vortex breaking system for reducing noise. While vortex development can generally be reduced by minimizing the aerodynamic load at the tip of the blade, so-called "tip unloading" typically causes a significant reduction in power that is produced by the blade.

The drawbacks and advantages of such tip unloading can also be achieved by decreasing the chord near the tip. For example, FIG. 7 is a plot of chord "c" as a percentage of total rotor radius "R" (also referred to as "c/R" or "normalized chord") versus normalized rotor radius for the conventional turbine blade discussed above with respect to FIGS. 2 and 3. The "tip chord distribution" 22 illustrated in FIG. 7 corresponds to the following data:

| r/R | c/R - 22 |
|---|---|
| 95.56% | 1.95% |
| 96.00% | 1.94% |
| 96.80% | 1.92% |
| 97.40% | 1.90% |
| 98.06% | 1.88% |
| 98.56% | 1.85% |
| 99.06% | 1.79% |
| 99.56% | 1.52% |
| 100.00% | 0.70% |

FIG. 9 is a plot of chord "c" as a percentage of total rotor radius "R" (also referred to as "c/R" or "normalized chord") for the leading and trailing edges of the blade tip verses normalized rotor radius for the conventional turbine blade discussed above and shown in FIGS. 2, 3 and 7. The resulting "tip planform distribution" or plan view of the contour of the blade tip corresponds to the following data where the zero value for c/R has been arbitrarily attributed to the pitch axis of the blade:

| r/R | c/R(24) | c/R(25) |
|---|---|---|
| 95.56% | 0.60% | −1.35% |
| 96.00% | 0.60% | −1.34% |
| 96.80% | 0.59% | −1.33% |
| 97.40% | 0.58% | −1.32% |
| 98.06% | 0.57% | −1.31% |
| 98.56% | 0.55% | −1.30% |
| 99.06% | 0.53% | −1.25% |
| 99.56% | 0.39% | −1.13% |
| 100.00% | 0.00% | −0.70% |

The values for c/R in plot 24 correspond to the leading edge (LE) of the blade while the values in plot 25 correspond to the trailing edge (TE) of the blade. A zero value for c/R is assigned to the center point of the pitch rotation on the chord at every rotor radiuswise location. It can be assigned to any other points of intersection between a line along the blade and the chord at every rotor radius location by adding or subtracting the appropriate amount from all of the c/R chord values.

BRIEF DESCRIPTION OF THE INVENTION

These and other drawbacks associated with such conventional approaches are addressed here in by providing, in various embodiments, a blade for a wind turbine including a total backward twist of between approximately 6 degrees and approximately 15 degrees between an outer approximately 1 percent to approximately 10 percent of a rotor radius of the blade; and an approximate planform distribution within the following ranges

| r/R | c/R(LE) | c/R(TE) |
|---|---|---|
| .96 | 0.60 to 0.65% | −1.42 to −1.34% |
| .968 | 0.54 to 0.59% | −1.31 to −1.34% |
| .974 | 0.39 to 0.58% | −1.36 to −1.22% |
| .9806 | 0.13 to 0.57% | −1.45 to −1.06% |
| .9856 | −0.23 to 0.56% | −1.56 to −0.74% |
| .9906 | −0.76 to 0.55% | −1.74 to −0.24% |
| .9956 | −1.44 to 0.54% | −1.99 to 0.23% |
| 1.00 | −2.17 to 0.54% | −2.27 to 0.44% | where "r/R" is an approximate normalized distance outward from a center of rotation of blade along a rotor radius of the blade; and "c/R(LE)" and "c/R(TE)" are approximate relative positions of a leading (LE) and trailing edge (TE) of a chord "c" expressed as a percentage of a total distance outward from a center of rotation at each r/R.

BRIEF DESCRIPTION OF THE DRAWINGS

Various aspects of this technology will now be described with reference to the following figures ("FIGS.") which are not necessarily drawn to scale, but use the same reference numerals to designate corresponding parts throughout each of the several views.

DETAILED DESCRIPTION OF THE INVENTION

Figure 1:
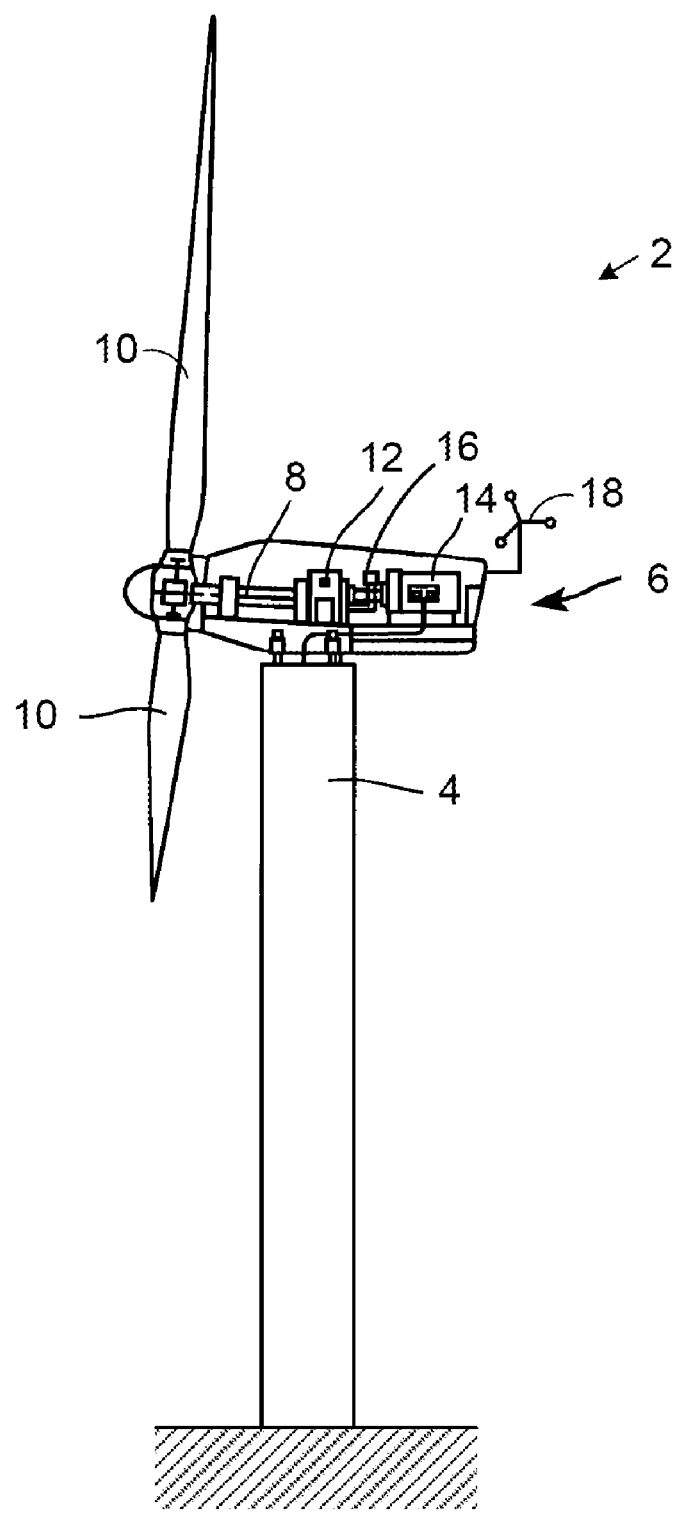
FIG. 1 is a schematic side view of a conventional wind generator.
Figure 2:
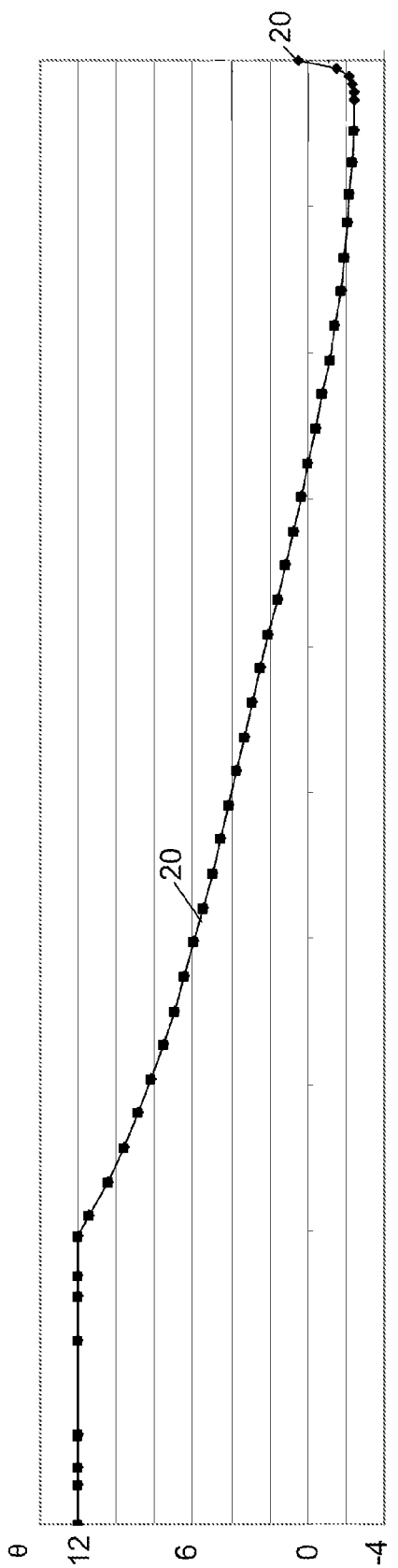
FIG. 2 is a chart illustrating a conventional twist distribution for the blade shown in FIG. 1.
Figure 3:
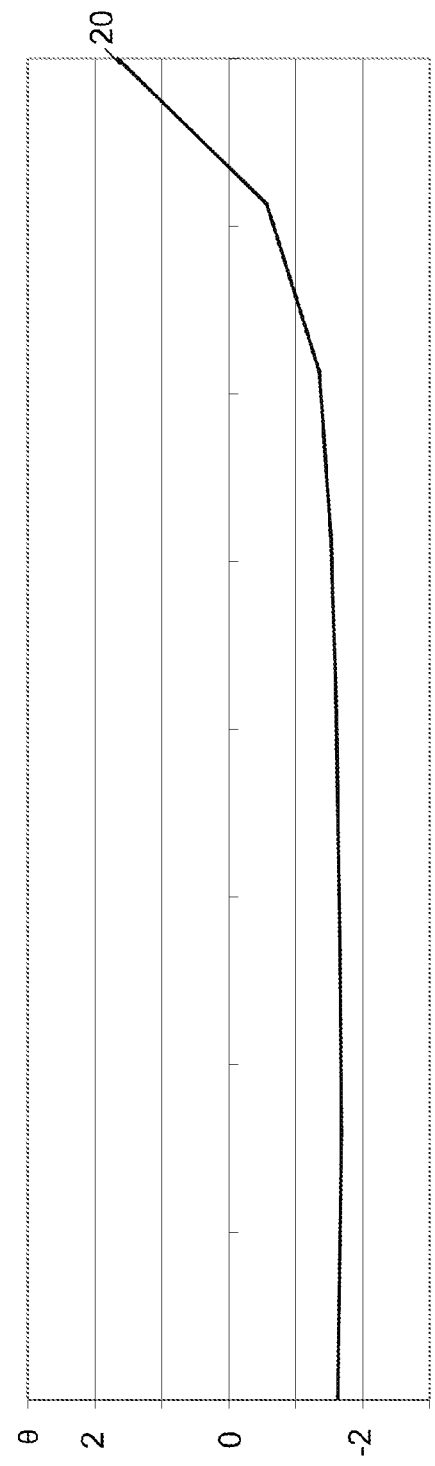
FIG. 3 is a chart illustrating an enlarged portion of the conventional tip twist distribution from FIG. 2.
Figure 4:
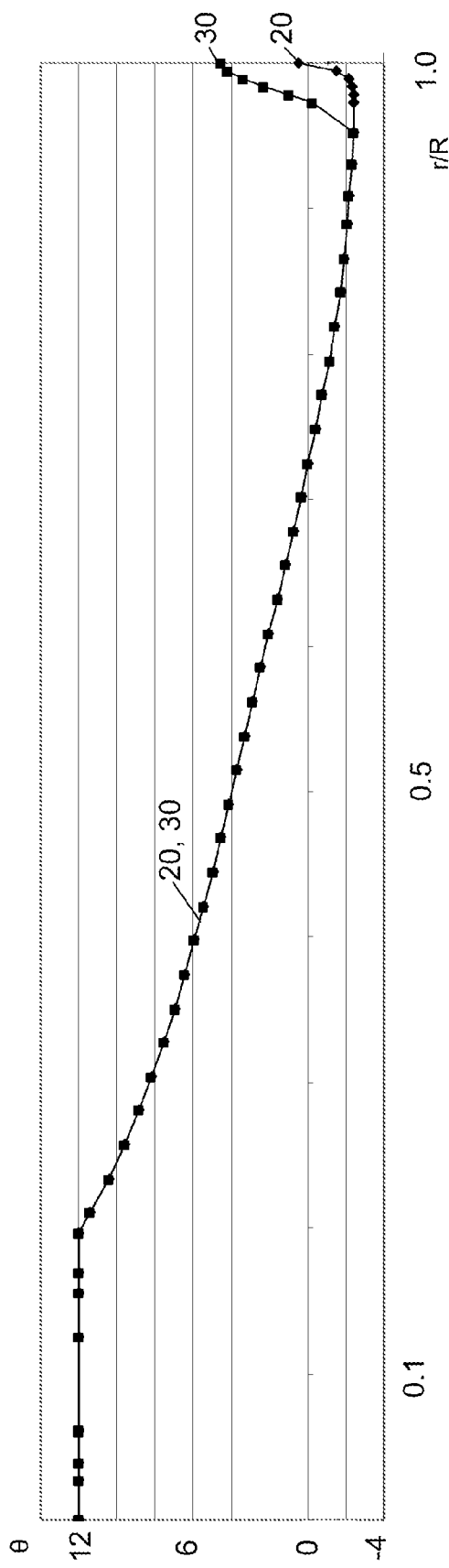
FIG. 4 a chart illustrating the conventional blade twist distribution from FIG. 2 and another blade twist distribution.

FIG. 4 is a chart illustrating the conventional blade twist distribution 20 from FIG. 2 along with another blade twist distribution 30. The blade twist distributions 20 and 30 are the same except for in the outer portion of the blade rotor radius near the tip of the blade 10 where the illustrated twist distribution 30 generally corresponds to the following numerical data:

| r/R | θ - 30 |
|---|---|
| 0.952128 | −2.40979 |
| 0.973404 | −0.28983 |
| 0.978723 | 0.999573 |
| 0.984043 | 2.292061 |
| 0.989362 | 3.421259 |

-continued

| r/R | θ - 30 |
|---|---|
| 0.994681 | 4.220788 |
| 1 | 4.52427 |

In comparison to the conventional twist distribution 20, the outer portion of the distribution 30 includes a larger total backward tip twist than the corresponding portion of the conventional twist distribution 20. The tip twist portion of the distribution 30 may also be used with other blades, including blades having other inboard twist distributions. The twist distribution 30 may also be pitched.

Figure 5:
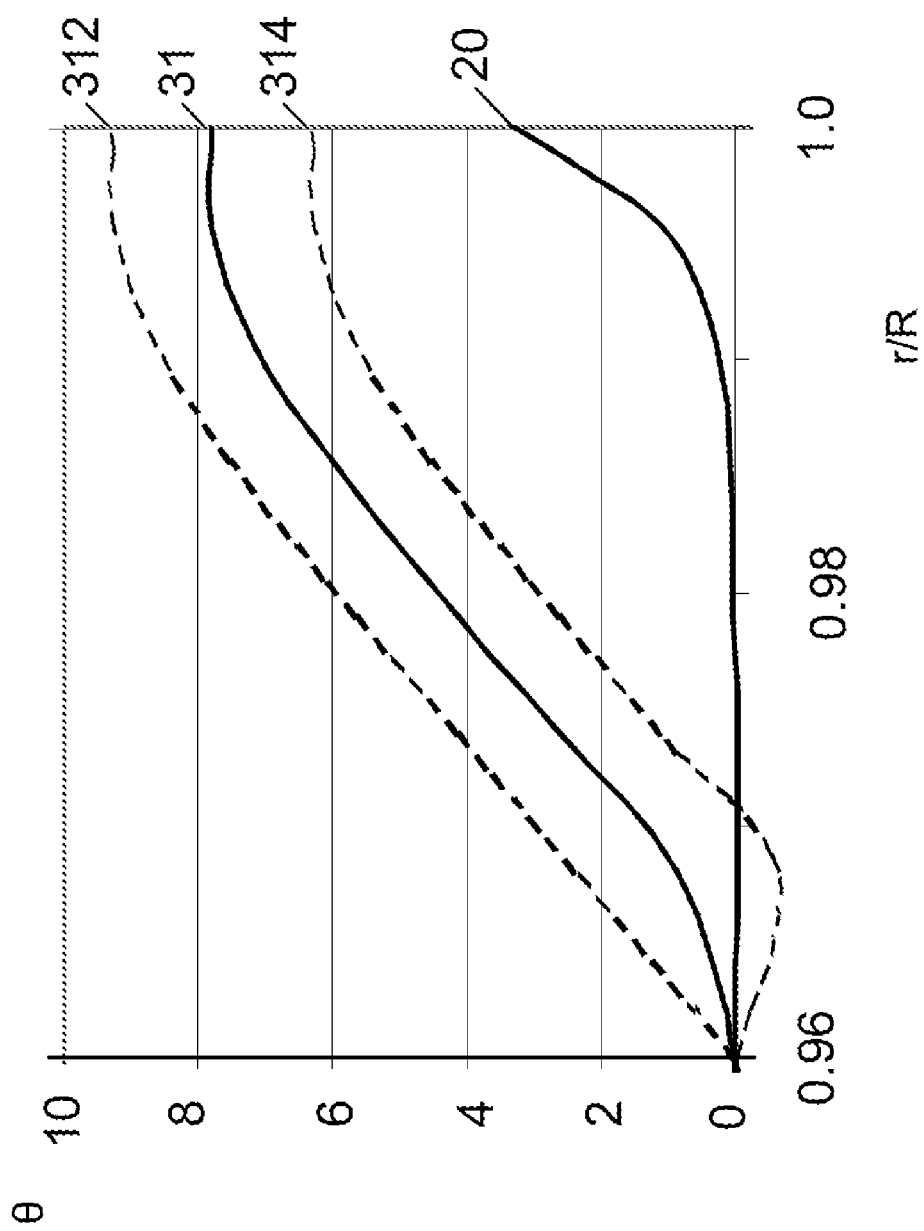
FIG. 5 is a chart illustrating another blade tip twist distribution and tolerance range along with the conventional tip twist distribution from FIG. 3.

The outer tip twist portion of the twist distribution 30 may also take a variety of other forms. For example, FIG. 5 illustrates the conventional tip twist distribution 20 along with another tip twist distribution 31 where the blades 10 have been pitched so that the twist at 0.96 r/R normalized rotor radius (about 96% of span) is arranged in the rotor plane corresponding to zero degrees twist. Dashed lines 312 and 314 in FIG. 5 further illustrate upper and lower tolerance bands of approximately ±1.5 degrees twist for most of the tip portion of twist distribution 31. The twist distribution 31 and tolerance bands 312 and 314 shown in FIG. 5 correspond to the following numerical data:

| r/R | θ - 31 | θ - 312 | θ - 314 |
|---|---|---|---|
| 0.96 | 0 | 0 | 0 |
| 0.968 | 0.865823127 | 2.365823127 | −0.63418 |
| 0.974 | 2.622128497 | 4.122128497 | 1.122128 |
| 0.98064 | 4.613066853 | 6.113066853 | 3.113067 |
| 0.98564 | 6.032056696 | 7.532056696 | 4.532057 |
| 0.99064 | 7.160486604 | 8.660486604 | 5.660487 |
| 0.99564 | 7.798481894 | 9.298481894 | 6.298482 |
| 1 | 7.798481894 | 9.298481894 | 6.298482 |

In FIG. 5, the upper and lower tolerance limits 312 and 314 are illustrated as converging upon the actual twist distribution at 96 percent of rotor radius, where the twist tolerance band may or may not be different for other portions of the blade. However, the upper and lower tolerance limits 312 and 314 are not required to converge with each other or twist distribution 31 as shown in FIG. 5. Furthermore other tolerance rages may also be used including as large as ±3 degrees, ±2 degrees, and as small as ±1 degree, ±0.75 degrees, ±0.5 degrees, ±0.25 degrees, and/or combinations thereof. These and other suitable tolerance ranges may also be expressed in terms of normalized and actual rotor radius, and/or normalized and actual percentage of twist.

Figure 6:
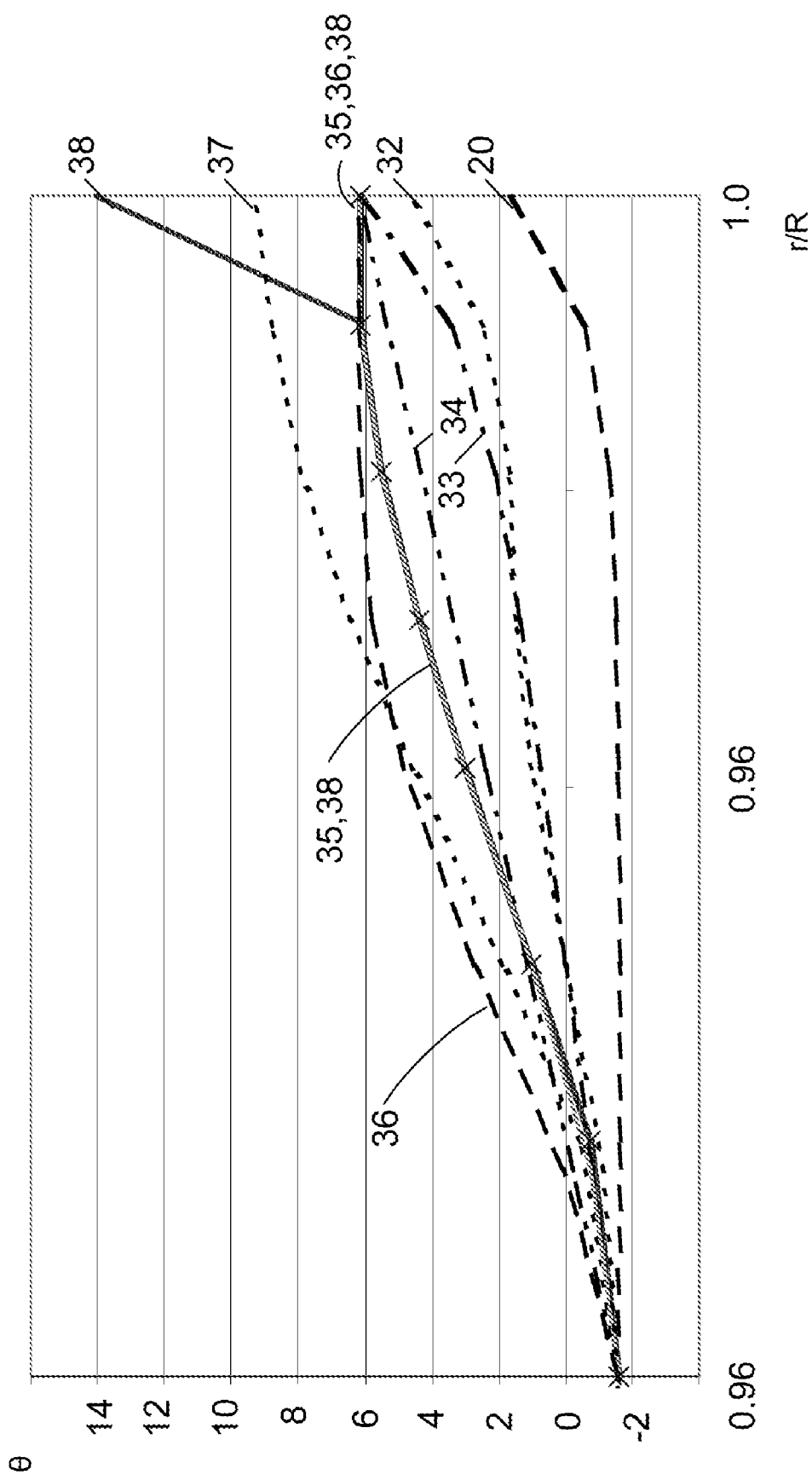
FIG. 6 is a chart illustrating various other blade tip twist distributions.

FIG. 6 illustrates several other configurations for the outer portion of the twist distribution 30 along with the conventional tip twist distribution 20 which correspond to the following numerical data:

It will be apparent from this data and FIG. 6 that several of the tip twist distributions overlap. For example, tip twist distributions 35 and 38 include the same data for r/R less than 99.56 percent.

The tip twist distributions in FIG. 6 have a total backward twist of between approximately six and fifteen degrees. For example, the total backward twist of the distribution 32 is approximately 6.30 degrees while the total backward twist of distribution 38 is approximately 15.63 degrees. However, these and other suitable tip twist distributions may be provided with a total backward twist of between approximately six and ten degrees. The tip twist distributions shown in FIG. 6 occur over the outer 4 percent of the blade rotor radius. However, these and other suitable tip twist distributions may be arranged between an outer one to ten percent of the blade rotor radius, or between an outer one to five percent of the blade rotor radius.

In each of the embodiments illustrated in FIG. 6, the twist angle θ increases over at least a portion of the outer portion of the rotor radius as indicated by the slope of the tip twist distribution lines. For example, the slope of the tip twist distribution, or "twist rate" (or "rate of twist", or "twist velocity") indicated by the change in twist angle θ relative to percent of rotor radius r/R, for tip twist distribution 34 is substantially constant. However, the tip twist distribution may also be curved as indicated by the curvature of the tip twist distribution lines with a twist rate that increases and/or decreases over some or all of the outer portion of the rotor radius. For example, the twist rate of the tip twist distribution 32 is increasing in an outboard portion of the illustrated distribution, while the twist rate of tip twist distribution 36 is decreasing in an outboard portion of the distribution. The twist rate of the tip twist distribution 35 increases in an inboard portion of the distribution, and then decreases in an outboard portion of the distribution. This changing slope of the tip twist distribution, the curvature of the twist distribution, or "twist acceleration" may also increase and/or decrease over these and other suitable tip twist distributions.

The various tip twist distributions discussed above offer high blade power performance, low tip related noise, and less sensitivity to turbulence. While typical backward twist distributions provide almost all unloading at the very tip of the blade 10, many of the tip twist distributions discussed above unload the blade slightly inboard of the tip with little or no twist change at the very tip of the blade. Beneficial unloading of the blade 10 at its outboard end results in increased power performance and lower noise. The tip twist distributions disclosed here also provide an optimum balance between a sharp drop in aerodynamic loading at the very end of the blade, which tends to produce a noisy tip vortex, and a more-gradual reduction of the blade load, which leads to suboptimal power performance over large portions of the blade. Furthermore, the tip twist distributions disclosed here maintain a relatively large chord over a longer portion of the blade in order to provide higher power performance and less sensitivity to changes in the wind inflow velocity. Such higher solidity tip shapes also enable higher precision manufacturing of blades that are less aerodynamically sensitive to physically constant

| r/R | θ - 20 | θ - 32 | θ - 33 | θ - 34 | θ - 35 | θ - 36 | θ - 37 | θ - 38 |
|---|---|---|---|---|---|---|---|---|
| 96.00% | −1.63 | −1.63 | −1.63 | −1.63 | −1.63 | −1.63 | −1.63 | −1.63 |
| 96.70% | −1.68 | −1.15 | −0.84 | −0.26 | −0.76 | 0.06 | −0.47 | −0.76 |
| 97.40% | −1.66 | 0.00 | 0.00 | 1.10 | 0.99 | 2.73 | 1.87 | 0.99 |
| 98.06% | −1.62 | 1.01 | 0.71 | 2.40 | 2.98 | 4.84 | 4.52 | 2.98 |
| 98.56% | −1.54 | 1.46 | 1.34 | 3.37 | 4.40 | 5.80 | 6.41 | 4.40 |
| 99.06% | −1.35 | 1.65 | 2.10 | 4.35 | 5.53 | 6.17 | 7.92 | 5.53 |
| 99.56% | −0.58 | 2.43 | 3.43 | 5.32 | 6.17 | 6.17 | 8.77 | 6.17 |
| 100.00% | 1.67 | 4.67 | 6.17 | 6.17 | 6.17 | 6.17 | 9.30 | 14.00 | contour deviations, with more room for drainage holes and lightning protection at the blade tip.

Figure 7:
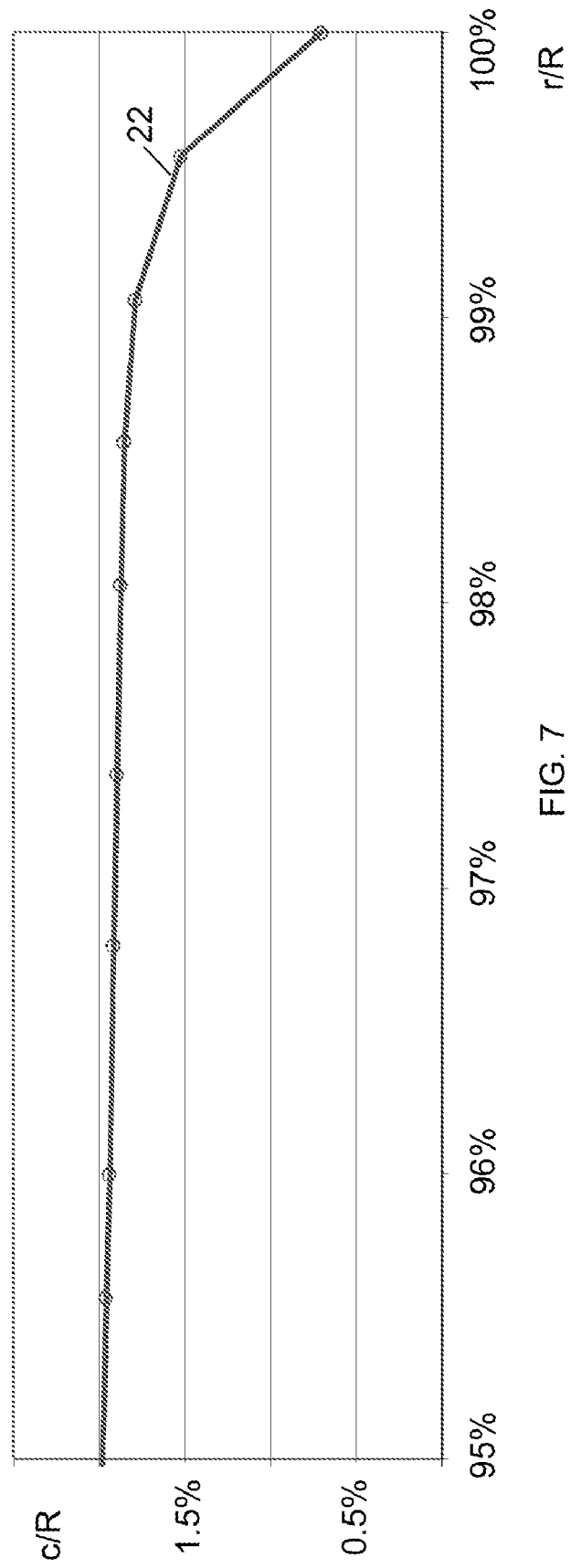
FIG. 7 is a chart illustrating a conventional blade tip chord distribution for the blade shown in FIG. 1.
Figure 8:
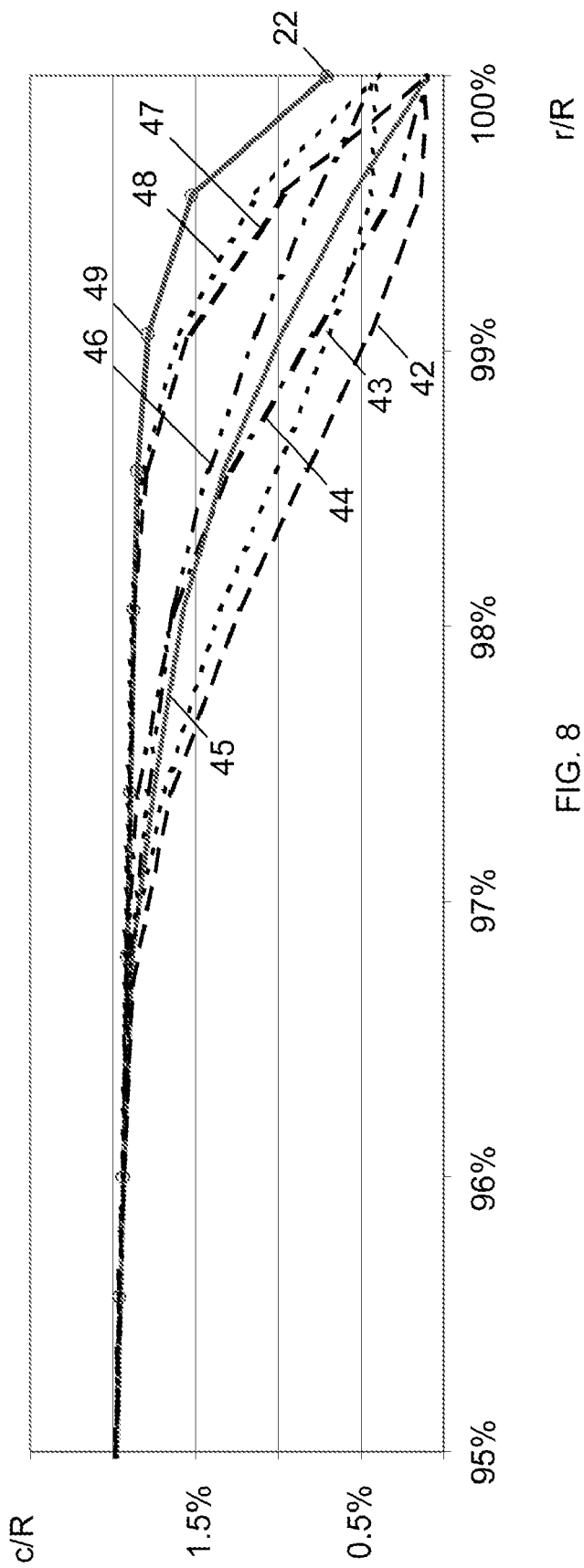
FIG. 8 is a chart illustrating various other blade tip distributions for the blade shown in FIG. 1.

FIG. 8 illustrates various tip chord distributions in addition to the conventional tip chord distribution 22 shown in FIG. 7 that correspond to the following data:

| r/R | c/R - 42 | c/R - 43 | c/R - 44 | c/R - 45 | c/R - 46 | c/R - 47 | c/R - 48 | c/R - 22 |
|---|---|---|---|---|---|---|---|---|
| 92.76% | 2.06% | 2.06% | 2.06% | 2.06% | 2.06% | 2.06% | 2.06% | 2.06% |
| 95.56% | 1.95% | 1.95% | 1.95% | 1.95% | 1.95% | 1.95% | 1.95% | 1.95% |
| 96.00% | 1.94% | 1.94% | 1.94% | 1.94% | 1.94% | 1.94% | 1.94% | 1.94% |
| 96.80% | 1.88% | 1.89% | 1.91% | 1.88% | 1.89% | 1.92% | 1.92% | 1.92% |
| 97.40% | 1.64% | 1.69% | 1.85% | 1.76% | 1.79% | 1.90% | 1.90% | 1.90% |
| 98.06% | 1.23% | 1.35% | 1.63% | 1.58% | 1.64% | 1.88% | 1.89% | 1.88% |
| 98.56% | 0.83% | 1.01% | 1.30% | 1.33% | 1.43% | 1.80% | 1.82% | 1.85% |
| 99.06% | 0.44% | 0.69% | 0.79% | 0.98% | 1.14% | 1.55% | 1.61% | 1.79% |
| 99.56% | 0.14% | 0.43% | 0.31% | 0.55% | 0.78% | 0.97% | 1.13% | 1.52% |
| 100.00% | 0.10% | 0.40% | 0.10% | 0.10% | 0.40% | 0.10% | 0.40% | 0.70% |

It will be apparent from this data and FIG. 8 that several of these tip chord distributions overlap.

Over the outer four percent of the rotor radius, the tip chord distributions 42 through 48 and 22 in FIG. 8 have a total normalized chord change of between approximately one and two percent. For example, the total normalized chord change of the distribution 42 is approximately 1.84 percent, while the total normalized chord change of the distribution 22 is 1.24 percent. Excluding the conventional tip chord distribution 22, the remaining tip chord distributions shown in FIG. 8 have a total tip chord change of between about one and a half and two percent, or 1.5 and 1.9 percent, and, more specifically as shown in FIG. 8, between 1.54 and 1.84 percent, over the outer four percent of the rotor radius.

The tip chord distributions described above with regard to FIG. 8 occur over the outer four percent of the blade rotor radius. However, these and other suitable tip twist distributions may be arranged between an outer one to ten percent of the blade rotor radius, or between an outer one to five percent of the blade rotor radius.

In each of the embodiments illustrated in FIG. 8, the normalized chord c/R decreases over at least a portion of the outer portion of the rotor radius as indicated by the slope of the chord distribution lines in FIG. 8. This "rate of change of the normalized chord" (or "chord change rate", "rate of chord change", "chord slope", or "chord change velocity") of "c/R" relative to percent of rotor radius "r/R", may be substantially constant. However, the chord distribution line may also be curved, having increasing and/or decreasing slope over some or all of the outer portion of the rotor radius. For example, the rate of chord change of the tip chord distributions 22, 45, 46, 47, 48, and 49 are increasing in an outboard portion of the illustrated distributions, while the rate of chord change of tip chord distributions 42, 43, and 44 are decreasing in an outboard portion of the distribution. In fact, the rate of chord change of the tip distributions 42, 43, and 44 initially increases, and then later decreases, over the outer four percent of the rotor radius.

The various advantages discussed above may be obtained and/or enhanced by utilizing the tip chord distributions 42 through 49 and 22 with any of the tip twist distributions 20 and 32 through 38 discussed above. For example, tip twist distribution 35 may be utilized with tip chord distribution 49 (in what has been referred to as a "high solidity blade tip"), or with tip chord distribution 45 (in what has been referred to as "a wind turbine blade tip design"). Tip twist distribution 38 may also be utilized with tip chord distribution 45 (in what has been referred to as a "thorn-shaped blade tip") and tip twist distribution 37 may be used with tip chord distribution 44 with ogee-style (and/or other) plan forms.

Figure 9:
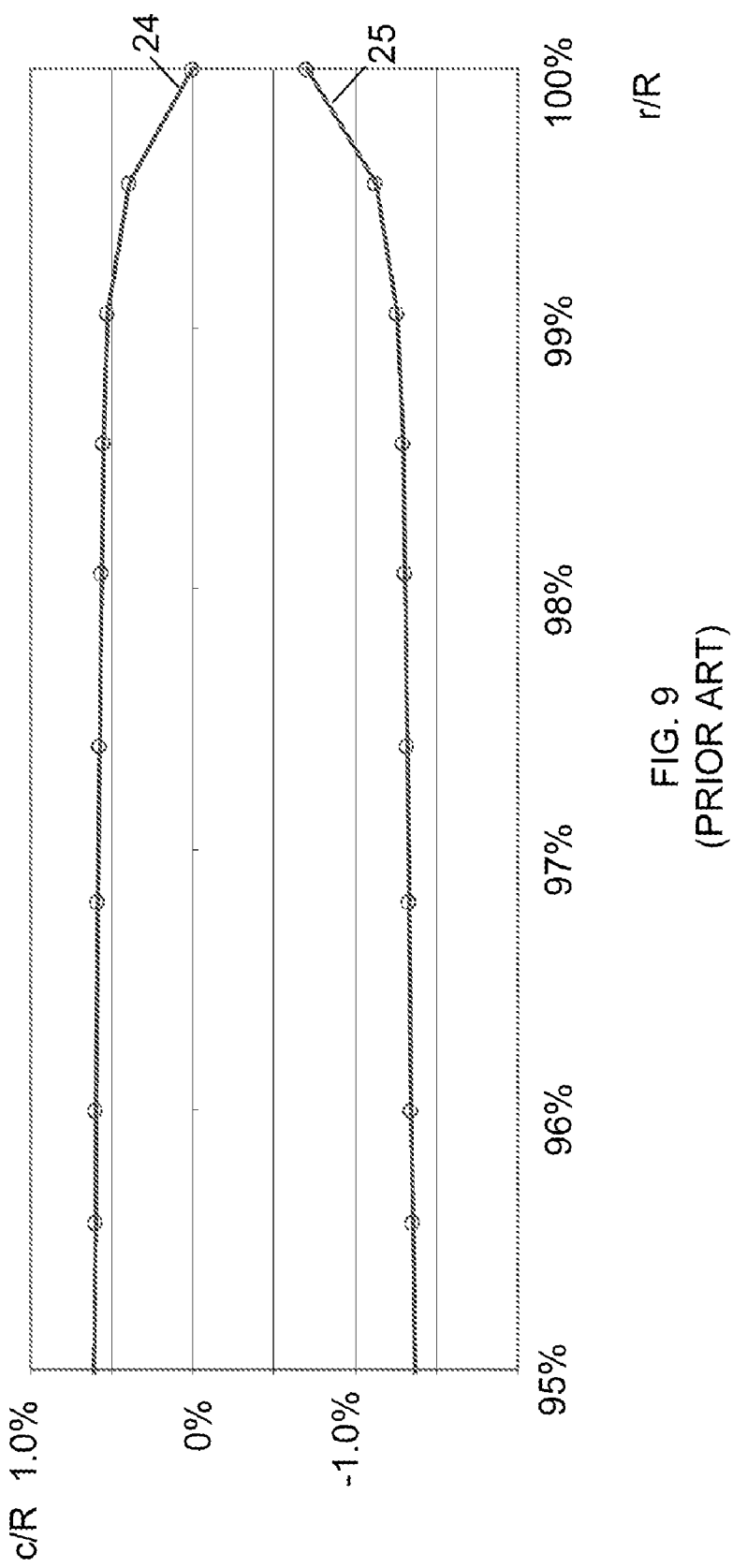
FIG. 9 is a chart illustrating a conventional blade tip planform distribution for the blade shown in FIG. 1.
Figure 10:
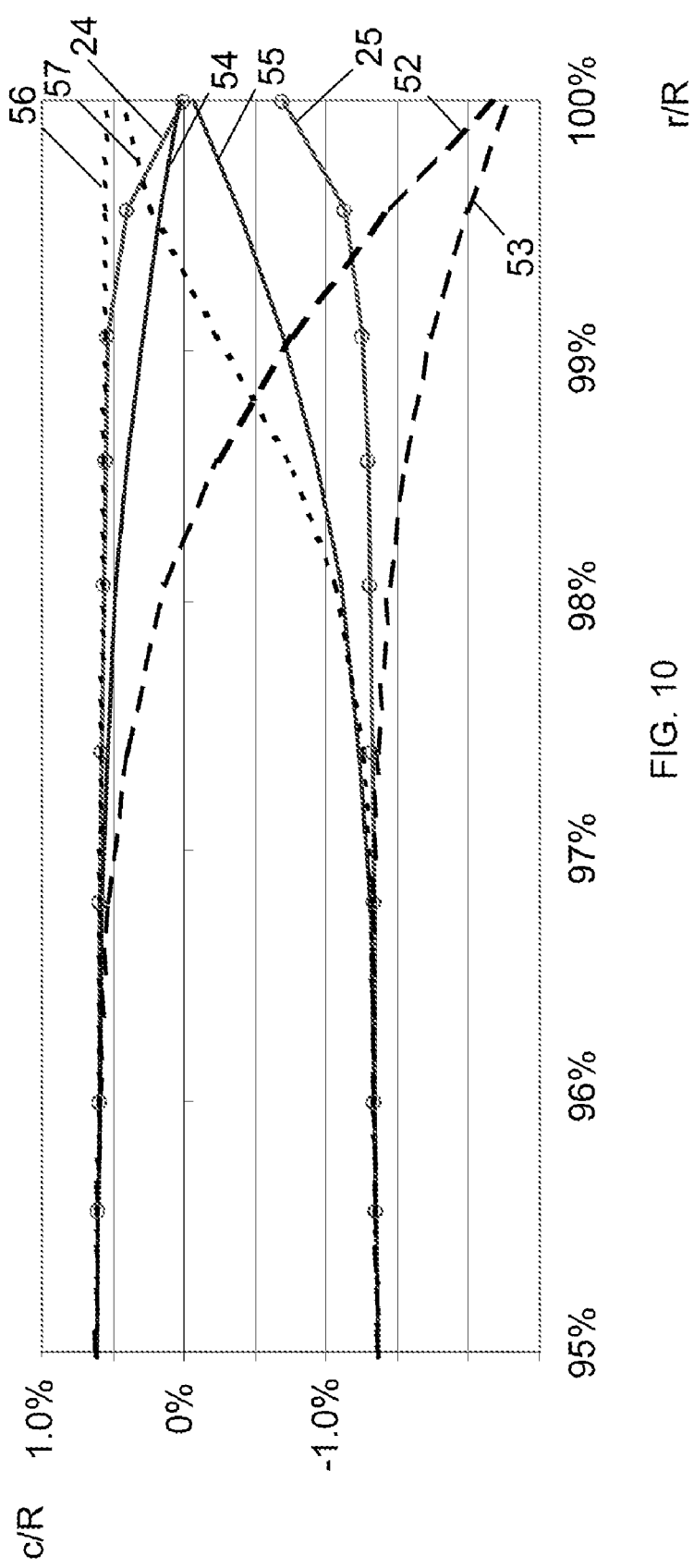
FIG. 10 is a chart illustrating other blade tip planform distributions for the blade shown in FIG. 1.

FIG. 10 illustrates various tip planform distributions that correspond to the following data in addition to the conventional tip planform distribution corresponding to plot lines 24 and 25 shown in FIG. 9:

| r/R | c/R - 24 | c/R - 25 | c/R - 52 | c/R - 53 | c/R - 54 | c/R - 55 | c/R - 56 | c/R - 57 |
|---|---|---|---|---|---|---|---|---|
| 92.76% | 0.65% | −1.42% | 0.65% | −1.42% | 0.65% | −1.42% | 0.65% | −1.42% |
| 95.56% | 0.60% | −1.35% | 0.60% | −1.35% | 0.60% | −1.35% | 0.60% | −1.35% |
| 96.00% | 0.60% | −1.34% | 0.60% | −1.34% | 0.60% | −1.34% | 0.60% | −1.34% |
| 96.80% | 0.59% | −1.33% | 0.54% | −1.34% | 0.57% | −1.31% | 0.58% | −1.33% |
| 97.40% | 0.58% | −1.32% | 0.39% | −1.36% | 0.53% | −1.22% | 0.57% | −1.27% |
| 98.06% | 0.57% | −1.31% | 0.13% | −1.45% | 0.48% | −1.10% | 0.56% | −1.06% |
| 98.56% | 0.55% | −1.30% | −0.23% | −1.56% | 0.40% | −0.93% | 0.56% | −0.74% |
| 99.06% | 0.53% | −1.25% | −0.76% | −1.74% | 0.29% | −0.69% | 0.55% | −0.24% |
| 99.56% | 0.39% | −1.13% | −1.44% | −1.99% | 0.16% | −0.39% | 0.54% | 0.23% |
| 100.00% | 0.00% | −0.70% | −2.17% | −2.27% | 0.03% | −0.07% | 0.54% | 0.44% |

In FIG. 10, the even numbered plot lines correspond to the leading edge (LE) while the odd numbered plot lines correspond to trailing edge (TE) of each planform distributions illustrated by plot lines 24 and 25, 52 and 53, 54 and 55, and 56 and 57. However, the leading and/or trailing edges may be paired from different planform distributions.

The various advantages discussed above may be obtained and/or enhanced by utilizing any of these planform distributions with various tip twist distributions, including any of the tip twist distributions 20 and 32 through 38 discussed above. For example, the conventional planform distribution formed by plot lines 24 and 25 is sometimes referred to as a "high solidity blade tip" and is particularly useful with tip twist distribution 35 and 38. The illustrated planform distribution formed by plot lines 52 and 53 is sometimes referred to as being "thorn-shaped" and is particularly useful with tip twist distributions 38. The illustrated planform distribution formed by plot fines 54 and 55 is sometimes referred to as the "wind turbine blade tip design" and is also particularly useful with tip twist distributions 35. The illustrated planform distribution formed by plot lines 56 and 57 is sometimes referred to as the "ogee" or "ogive" tip and is particularly useful with tip twist distribution 37.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A blade for a wind turbine, comprising:
   a total backward twist of between approximately 6 degrees and approximately 15 degrees between an outer approximately 1 percent to approximately 10 percent of a rotor radius of the blade; and
   an approximate planform distribution within the following ranges

| r/R    | c/R(LE)        | c/R(TE)          |
   |--------|----------------|------------------|
   | .96    | 0.60 to 0.65%  | −1.42 to −1.34%  |
   | .968   | 0.54 to 0.59%  | −1.31 to −1.34%  |
   | .974   | 0.39 to 0.58%  | −1.36 to −1.22%  |
   | .9806  | 0.13 to 0.57%  | −1.45 to −1.06%  |
   | .9856  | −0.23 to 0.56% | −1.56 to −0.74%  |
   | .9906  | −0.76 to 0.55% | −1.74 to −0.24%  |
   | .9956  | −1.44 to 0.54% | −1.99 to 0.23%   |
   | 1.00   | −2.17 to 0.54% | −2.27 to 0.44%   | wherein "r/R" is an approximate normalized distance outward from a center of rotation of the blade along the span of the blade; and
   wherein "c/R(LE)" and "c/R(TE)" are approximate relative positions of a leading (LE) and trailing edge (TE) of a chord "c" expressed as a percentage of a distance outward from the center of rotation at each r/R.

2. The blade recited in claim 1, wherein the approximate planform distribution comprises

| r/R    | c/R(LE) | c/R(TE) |
   |--------|---------|---------|
   | .96    | 0.60%   | −1.34%  |
   | .968   | 0.59%   | −1.33%  |
   | .974   | 0.58%   | −1.32%  |
   | .9806  | 0.57%   | −1.31%  |
   | .9856  | 0.55%   | −1.30%  |
   | .9906  | 0.53%   | −1.25%  |
   | .9956  | 0.39%   | −1.13%  |
   | 1.00   | 0.00%   | −0.70%. |

3. The blade recited in claim 2, wherein the total backward twist is between approximately 6 degrees and approximately 10 degrees between the outer approximately 1 to approximately 5 percent of the blade rotor radius.

4. The blade for a wind turbine recited in claim 2, having a tip twist distribution

| r/R  | θ     |
   |------|-------|
   | .960 | −1.63 |
   | .967 | −1.68 |
   | .974 | −1.66 |
   | .981 | −1.62 |
   | .986 | −1.54 |
   | .991 | −1.35 |
   | .996 | −0.58 |
   | 1.0  | 0.0   | wherein θ is an approximate angle of the twist in degrees.

5. The blade recited in claim 1, wherein the approximate planform distribution comprises

| r/R    | c/R(LE) | c/R(TE) |
   |--------|---------|---------|
   | .96    | 0.60%   | −1.34%  |
   | .968   | 0.57%   | −1.31%  |
   | .974   | 0.53%   | −1.22%  |
   | .9806  | 0.48%   | −1.10%  |
   | .9856  | 0.40%   | −0.93%  |
   | .9906  | 0.29%   | −0.69%  |
   | .9956  | 0.16%   | −0.39%  |
   | 1.00   | 0.03%   | −0.07%. |

6. The blade recited in claim 5, wherein the total backward twist is between approximately 6 degrees and approximately 10 degrees between the outer approximately 1 percent to approximately 5 percent of the blade rotor radius.

7. The blade for a wind turbine recited in claim 5, having a tip twist distribution

| r/R  | θ     |
   |------|-------|
   | .960 | −1.63 |
   | .967 | −0.76 |
   | .974 | 0.99  |
   | .981 | 2.98  |
   | .986 | 4.40  |
   | .991 | 5.53  |
   | .996 | 6.17  |
   | 1.0  | 6.17  | wherein θ is an approximate angle of the twist in degrees.

8. The blade recited in claim 1, wherein the approximate planform distribution comprises

| r/R    | c/R(LE) | c/R(TE) |
   |--------|---------|---------|
   | .96    | 0.60%   | −1.34%  |
   | .968   | 0.58%   | −1.33%  |
   | .974   | 0.57%   | −1.27%  |
   | .9806  | 0.56%   | −1.06%  |
   | .9856  | 0.56%   | −0.74%  |
   | .9906  | 0.55%   | −0.24%  |
   | .9956  | 0.54%   | 0.23%   |
   | 1.00   | 0.54%   | 0.44%.  |

9. The blade recited in claim 8, wherein the total backward twist is between approximately 6 degrees and approximately 10 degrees between the outer approximately 1 percent to approximately 5 percent of the blade rotor radius.

10. The blade for a wind turbine recited in claim 8, having a tip twist distribution

| r/R | θ |
|---|---|
| .960 | −1.63 |
| .967 | −0.76 |
| .974 | 0.99 |
| .981 | 2.98 |
| .986 | 4.40 |
| .991 | 5.53 |
| .996 | 6.17 |
| 1.0 | 14.00 | wherein θ is an approximate angle of the twist in degrees.

11. The blade recited in claim 1, wherein the approximate planform distribution comprises

| r/R | c/R(LE) | c/R(TE) |
|---|---|---|
| .96 | 0.60% | −1.34% |
| .968 | 0.54% | −1.34% |
| .974 | 0.39% | −1.36% |
| .9806 | 0.13% | −1.45% |
| .9856 | −0.23% | −1.56% |
| .9906 | −0.76% | −1.74% |
| .9956 | −1.44% | −1.99% |
| 1.00 | −2.17% | −2.27%. |

12. The blade recited in claim 11, wherein the total backward twist is between approximately 6 degrees and approximately 10 degrees between the outer approximately 1 percent to 5 percent of the blade rotor radius.

13. The blade for a wind turbine recited in claim 11, having a tip twist distribution

| r/R | θ |
|---|---|
| .960 | −1.63 |
| .967 | −0.47 |
| .974 | 1.87 |
| .981 | 4.52 |
| .986 | 6.41 |
| .991 | 7.92 |
| .996 | 8.77 |
| 1.0 | 9.30 | wherein θ is an approximate angle of the twist in degrees.

14. The blade recited in claim 1 wherein the total backward twist is between approximately 6 degrees and approximately 10 degrees between the outer approximately 1 percent to approximately 10 percent of the blade rotor radius.

15. The blade recited in claim 1, wherein the total backward twist is between approximately 6 degrees and approximately 10 degrees between the outer approximately 1 percent to approximately 5 percent of the blade rotor radius.

\* \* \* \* \*